H. D. WHITE.
METHOD OF MAKING LANTERN SLIDES.
APPLICATION FILED OCT. 28, 1911.

1,048,248.

Patented Dec. 24, 1912.

Haywood D. White,
Inventor, by C. A. Snow & Co.,
Attorneys.

Witnesses:

UNITED STATES PATENT OFFICE.

HAYWOOD D. WHITE, OF RALEIGH, NORTH CAROLINA.

METHOD OF MAKING LANTERN-SLIDES.

1,048,248.

Specification of Letters Patent. Patented Dec. 24, 1912.

Application filed October 28, 1911. Serial No. 657,386.

*To all whom it may concern:*

Be it known that I, HAYWOOD D. WHITE, a citizen of the United States, residing at Raleigh, in the county of Wake and State of North Carolina, have invented a new and useful Method of Making Lantern-Slides, of which the following is a specification.

The primary object of the present invention is to provide a method of placing non-actinic exhibitive matter on transparent films.

A further object of the invention is to provide means for simultaneously placing a negative and positive upon a light pervious film and making a record of the data placed upon said film.

Figure 1:
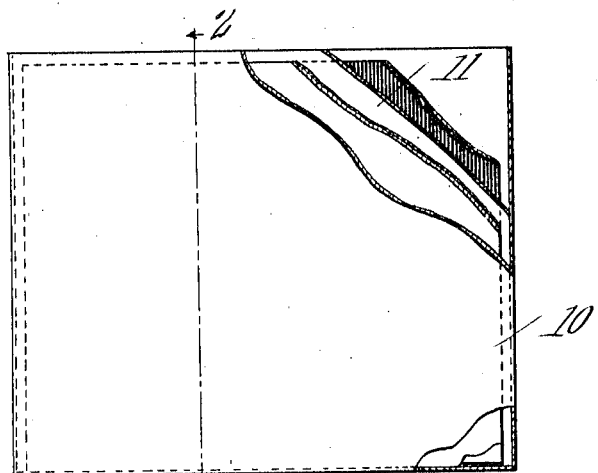
Figure 2:
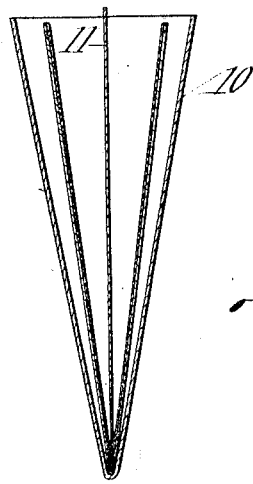
Figure 3:
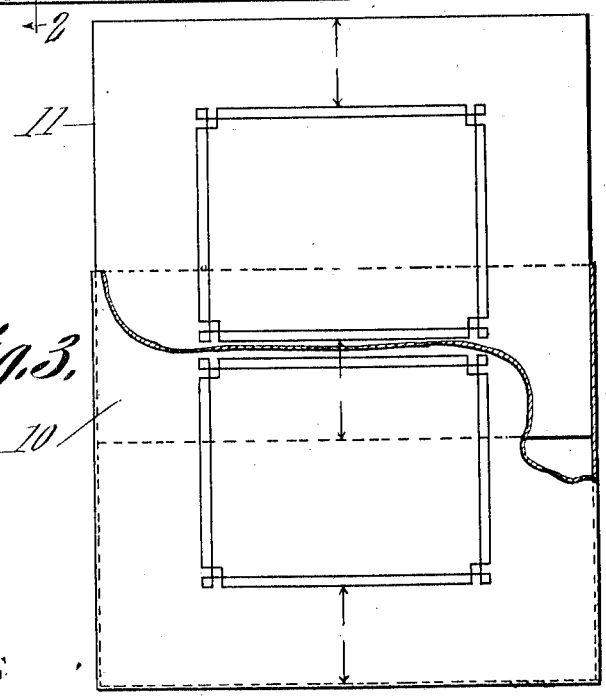
Figure 4:

In the drawings:—Figure 1 is a view illustrating a means for carrying out the method, portions being broken away to show the arrangement of the carbon sheet, etc., by means of which the printing or illustration is placed upon the film. Fig. 2 is a section taken on the line 2—2 of Fig. 1. Fig. 3 is a view showing the film partially withdrawn from the envelop which incases the same during the printing operation, and Fig. 4 is an enlarged sectional view of the film after the exhibitive matter has been placed thereupon.

The device is primarily intended for use in newspaper offices where the news as received will be printed on a sheet of paper which is to be sent to the composing room and upon a film for display upon a screen. In carrying out this idea, an envelop 10 which is of thin waxed paper is provided and on one face of said envelop is stamped a frame or border which may be of any appropriate design, the border being equally spaced from the edges of said envelop.

The film 11 upon which the data is placed and which is of the usual transparent material is slightly smaller than the envelop, a border or frame being centered upon the film in the same manner as upon the envelop, the borders registering when the film is inserted in the envelop. The data, should the device be used in newspaper offices, may be news which it is desired to cast upon a screen and at the same time set up for printing. The negative and positive which is placed upon the film is made by a sheet of manifolding paper, which is folded centrally, the film being inserted within the folded paper, the manifolding surfaces of the paper contacting with both faces of the film. The film and carbon are then placed in the envelop 10 and the data which it is desired to place upon the film is printed, or otherwise stamped within the border which has been previously stamped on the envelop, thus as the border on the envelop and the border on the film are in register, the operator may, by properly centering the printing within the first mentioned border at the same time properly center the same within the border on the film. The data is thus actually printed upon the envelop the carbon causing a positive printing upon the face of the film adjacent the face of the envelop on which the border is stamped and a negative upon the face of the film remote from said border. Thus in a single operation a printed record upon paper is formed as well as a negative and positive printing upon the film, attention being called to the fact that the paper which receives the printed record forms a casing for the carbon and film.

The device may be used as an advertising medium for kinematographs and the data placed upon the film may be in the nature of announcements or in fact pictures may be stamped or sketched in the bordered space and a negative and a positive of the same placed upon the film. When used in this connection, the envelop which also receives the announcement or illustration forms a permanent record which may be retained for reference. The many uses to which such a method may be applied is clearly apparent and it is not thought necessary to further elaborate upon the advantages of the same.

What is claimed is:—

1. A method of placing non-actinic exhibitive matter upon a transparent film and simultaneously making a printed record upon a sheet of material, consisting in placing the film between two manifold surfaces, placing said film and the manifolding material within an envelop and printing upon one face of said envelop.

2. A method of placing non-actinic exhibitive matter upon a transparent film, simultaneously making a printed record of such matter separate from that placed upon the film and of centering the matter placed upon the film within a border previously stamped on said film consisting in incasing the film in manifolding material the surface of which contacts with both sides of the film, and placing said film and manifolding material in an envelop provided with a border adapted to register with the border of the film and placing exhibitive matter within the border arranged on the envelop by impression.

In testimony that I claim the foregoing as my own, I have hereto affixed my signature in the presence of two witnesses.

HAYWOOD D. WHITE.

Witnesses:
    MARX S. NATHAN,
    M. J. GODMAN.